US007367539B2

(12) United States Patent
Moss et al.

(10) Patent No.: US 7,367,539 B2
(45) Date of Patent: May 6, 2008

(54) FOLDABLE AND SELF-ERECTING DISPLAY STAND AND EASEL

(75) Inventors: Geoffrey Alan Moss, Maple (CA); David Brian Minister, North York (CA)

(73) Assignee: Poptech Limited, Toronto, Ontario (CA)

( * ) Notice: Subject to any disclaimer, the term of this patent is extended or adjusted under 35 U.S.C. 154(b) by 184 days.

(21) Appl. No.: 10/869,375

(22) Filed: Jun. 17, 2004

(65) Prior Publication Data

US 2005/0279906 A1 Dec. 22, 2005

(51) Int. Cl.
*F16M 11/38* (2006.01)

(52) U.S. Cl. ........................ 248/460; 248/465; 40/610; 40/787

(58) Field of Classification Search ................ 248/127, 248/160, 165, 166, 434, 168, 170, 460, 465; 211/132.1, 135; 40/610, 787, 750, 755; 311/72, 311/73, 74

See application file for complete search history.

(56) References Cited

U.S. PATENT DOCUMENTS 1,710,814 A * 4/1929 Dyment ...................... 248/459
1,759,519 A * 5/1930 Moore ...................... 40/124.18
1,976,421 A * 10/1934 Tracger et al. .............. 248/459
2,474,659 A * 6/1949 Ebert .......................... 248/459
3,727,874 A * 4/1973 Wuensch .................... 248/459
5,467,547 A * 11/1995 Fortner ......................... 40/610
6,098,820 A * 8/2000 Smith ....................... 211/132.1
6,508,023 B2 * 1/2003 Moss et al. ................... 40/610

* cited by examiner

*Primary Examiner*—A. Joseph Wujciak, III
(74) *Attorney, Agent, or Firm*—David W. Wong

(57) ABSTRACT

A foldable and self-erecting display stand has an easel mounted at the rear surface of a large planar board. The planar board and the easel are together foldable along a plurality of horizontal fold lines to a compact collapsed state. The easel has a U-shaped horizontal cross section and two mutually parallel triangular side walls. A plurality of pivotable cross braces extend in a canti-lever manner from a body board of the easel. A plurality of elastic cords are mounted between the cross braces and the side walls of the easel. The side walls of the easel are foldable to a collapsed position juxtaposed to the planar board against the elastic force of the elastic cords for folding the display stand to the collapsed state. The elastic cords are in a stretched condition when the display stand in the collapsed state, and the cross braces cooperate with the stretched elastic cords to self-erecting the display stand from the collapsed state to the erected state.

4 Claims, 9 Drawing Sheets

FOLDABLE AND SELF-ERECTING DISPLAY STAND AND EASEL

FIELD OF THE INVENTION

This invention relates to foldable stands having a support easel integrally formed at theirs rear surface. The stands and easel are foldable in a collapsed condition along a plurality of horizontal fold lines to compact packages for ease in shipping and storage, and they are self-erecting from the folded condition to an erected condition.

BACKGROUND OF THE INVENTION

Stands made of cardboard material are commonly used for displaying merchandise. They are cost effective and convenience to use. Such stands have a large planar board supported by an easel. The board may have an attractive advertising design shown on its front surface for attracting customers' attention and may also have provision for displaying merchandise hung on hooks and/or held in trays mounted to the board. The easel has an L-shaped or T-shaped leg portion for supporting the planar board to stand in a substantially vertical position. One common drawback of such stands is that the L-shaped or T-shaped leg portion of the easel is rather small in size relative to the planar board and are not strong in construction such that it may break easily in use rendering the stands unusable.

Some stands are foldable along horizontal fold lines to a compact collapsed condition for convenient storage and transportation and may also be self-erecting from the folded condition to an erected condition for easy set up of the display. The self-erecting function is provided by a plurality of elastic bands mounted directly between parallel vertical side walls of the easel. The stand and the easel may be folded in the collapsed condition by stretching the elastic bands against their elastic force, and the stand in the collapsed folded condition may be erected by holding its top portion and raising it upwards to allow the stretched elastic bands to pull the stand and easel quickly to the erected condition. It has been very problematic to select the acceptable elastic bands that may allow the stand to be folded easily as well as subsequently self-erecting. The elastic bands must not have too strong an elastic strength so that the stand and the easel may be folded with ease yet they must have a sufficient elastic strength to return the folded stand and easel to the erected condition. Another problem is that due to the direct mounting of the elastic bands between the side walls of the easel, they would cause these side walls to deform or tear at the mounting locations resulting in the loss of the integrity or strength of the side walls to support the planar board in the erected condition.

Another further common problem with self-erecting stands and easel is that the cardboard material in the folded condition retains a folded memory such that it cannot be unfolded readily to the erected condition by the elastic force of the elastic bands.

SUMMARY OF THE INVENTION

It is a principal object of the present invention to provide foldable display stands with a relatively rugged easel which support them to stand securely in the erected condition.

It is another object of the present invention to provide foldable display stands with an easel which are self-erecting readily and easily.

It is another object of the present invention to provide foldable self-erecting display stands in which the elastic cords for executing the self-erecting operation are not connected directly between the side walls of the easel.

It is yet another object of the present invention to provide foldable self-erecting display stands is which the easel and the planar board are erected by the operation of pivotal cross braces.

It is yet another object of the present invention to provide foldable display stands which are not subject to folded memory.

DETAIL DESCRIPTION OF THE PREFERRED EMBODIMENTS

Figure 1:
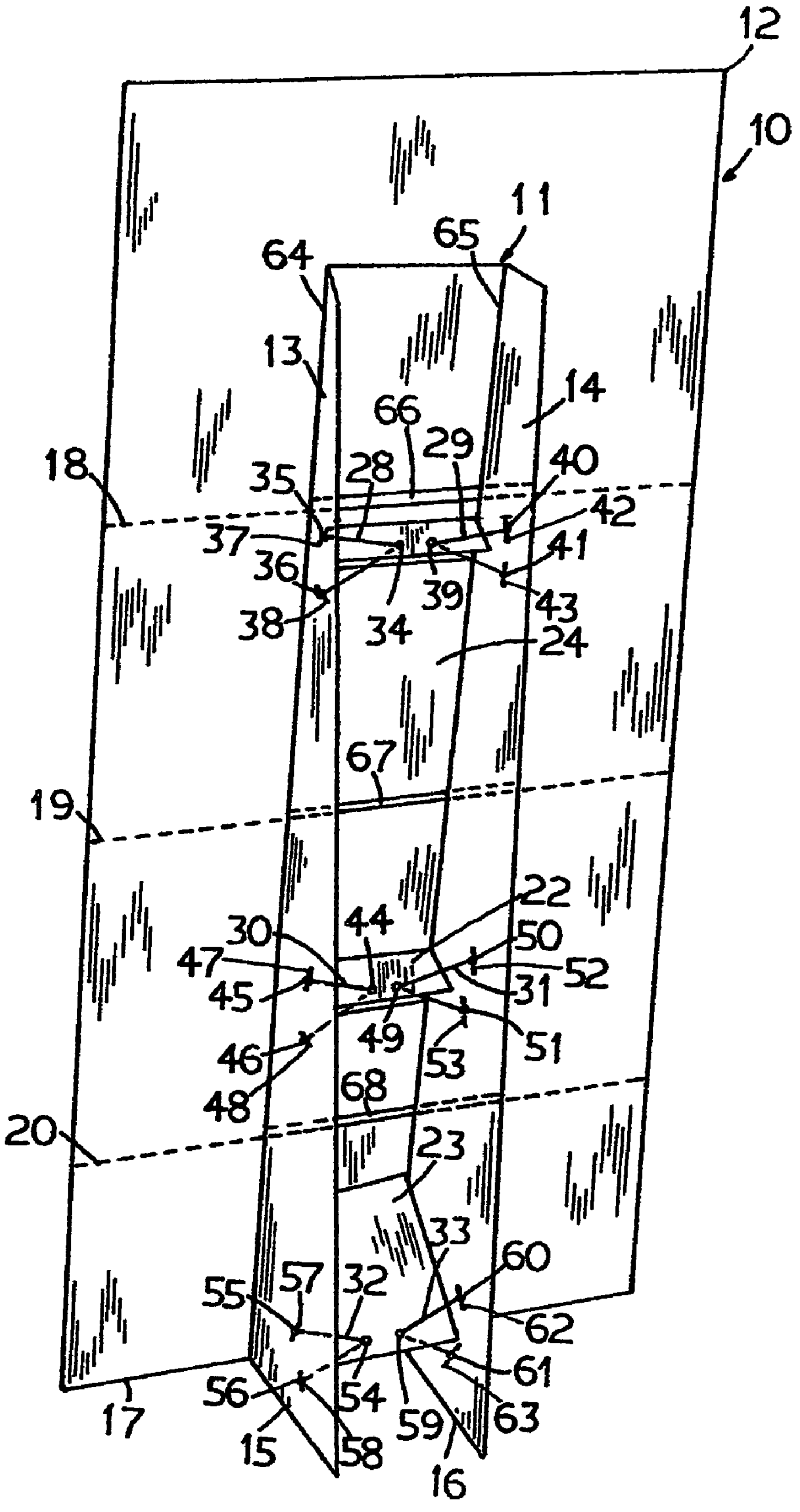
FIG. 1 is a perspective rear elevation of the stand of the present invention in the erected condition.
Figure 2:
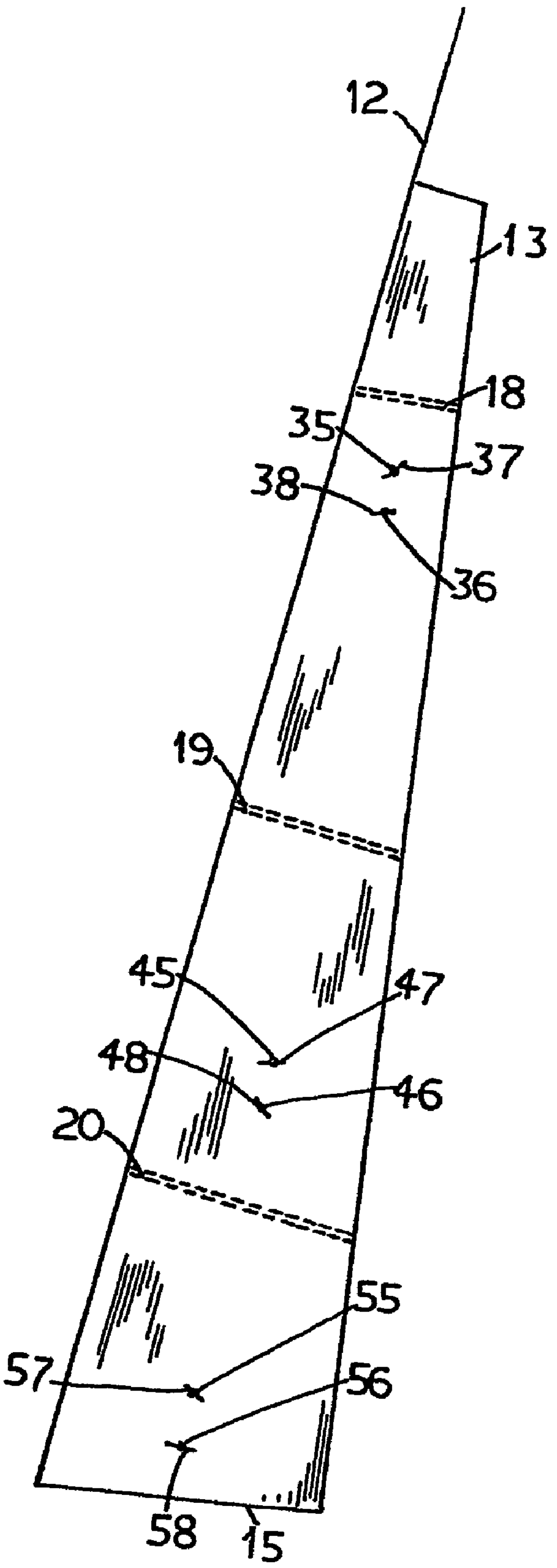
FIG. 2 is a perspective side elevation of the stand showing the generally triangular side wall of the easel.
Figure 3:
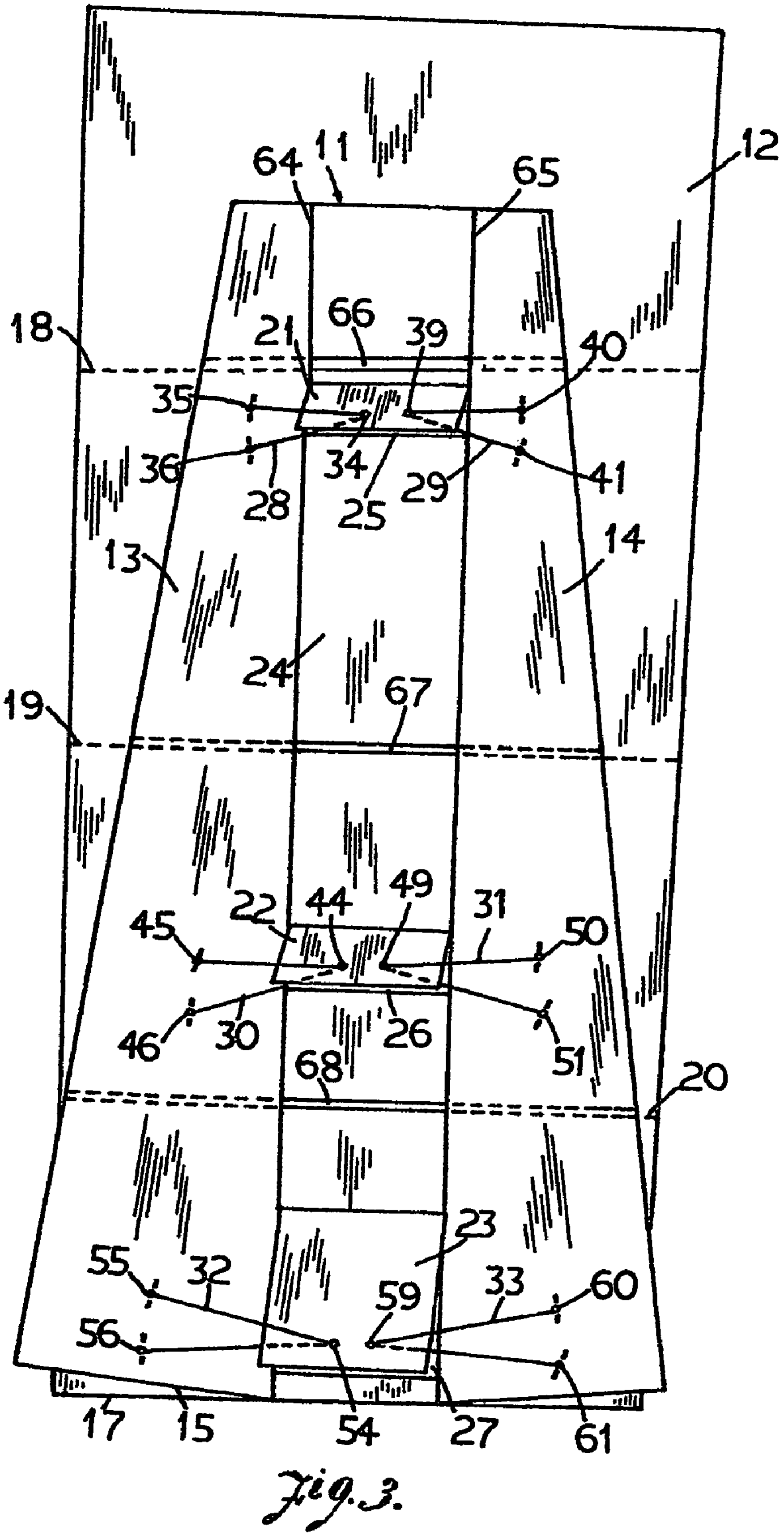
FIG. 3 is a perspective rear elevation view of the stand with the easel in the collapsed condition.

With reference to the drawings in which like reference numeral designate corresponding parts in the several views, in one exemplary embodiment of the display stand 10 of the present invention it includes an easel 11 mounted at a middle portion of the rear surface of a planar board 12 to form an integral composite construction. The easel 11 and the planar board 12 are made of a single sheet of cardboard material. The easel 11 has a U-shaped horizontal transverse cross section and the two parallel side walls 13 and 14 are generally triangular in shape. The bottom edges 15 and 16 of the side walls 13 and 14 respectively are aligned with the bottom edge 17 of the planar board 12 and may be sloping upwardly and rearwardly at a small angle so that in the erected condition the top of the planar board is leaning slightly rearwardly to provide the stand with stability as well as better view of the planar front surface to an observer. The integral composite of the easel 11 and the planar board 12 are foldable along a plurality of parallel horizontal score lines 18, 19 and 20 as shown in dotted lines. Three rectangular pivotal cross braces 21, 22, and 23 are formed in the easel 11. These cross braces 21, 22, and 23 may be formed by cutting them from the central board 24 of the easel 11 and they are pivotable in a cantilever manner horizontally relative to the central board 24. In the collapsed condition, the cross braces 21, 22, and 23 would lie flush within the rectangular openings 25, 26, and 27 respectively of the central board 24 from which the braces are formed.

An elastic cord 28 is mounted between the top cross brace 21 and the side wall 13 of the easel 11 by threading through an opening 34 formed in the cross brace 21 and two mounting openings 35 and 36 formed in the side wall 13. Two abutment bars 37 and 38 are provided at the two ends of the elastic cord 28 for retaining the elastic cord 28 in the mounted position. Similarly, an elastic cord 29 is mounted between the top cross brace 21 and the side wall 14 through an opening 39 formed in the cross brace 21 and two mounting openings 40 and 41 formed on the side wall 14 of the easel 11. Two abutment bars 42 and 43 are provided at the two ends of the elastic cord 29. An elastic cord 30 is mounted between the middle cross brace 22 and the side wall 13 of the easel 11 through an opening 44 formed in the middle cross brace 22 and two mounting openings 45 and 46 formed in the side wall 13 of the easel 11. Two abutment bars 47 and 48 are provided at the two ends of the elastic cord 30. An elastic cord 31 is mounted between the middle cross brace 22 and the side wall 14 of the easel 11 through an opening 49 formed in the middle cross brace 22 and two mounting openings 50 and 51 formed in the side wall 14 of the easel 11. Two abutment bars 52 and 53 are provided at the two ends of the elastic cord 31. An elastic cord 32 is mounted between the bottom cross brace 23 and the side wall 13 of the easel 11 through an opening 54 formed in the bottom cross brace 23 and two mounting openings 55 and 56 formed in the side wall 13 of the easel 11. Two abutment bars 57 and 58 are provided at the two ends of the elastic cord 32. An elastic cord 33 is mounted between the bottom cross brace 23 and the side wall 14 of the easel 14 through an opening 59 formed in the bottom cross brace 23 and two mounting openings 60 and 61 formed in the side wall 14 of the easel 11; and two abutment bars 62 and 63 are provided at the two ends of the elastic cord 33. The elastic cords 28, 29, 30, 31, 32 and 33 cooperating with the cross braces 21, 22 and 23 to maintain the side walls 13 and 14 in the positions parallel to one another normally so as to maintain the easel 11 and the planar board 12 in the erected condition. The side walls 13 and 14 may be folded outwards along two vertical fold lines 64 and 65 relative to the central board 24 of the easel 11 against the elastic force of the elastic cords 28, 29, 30, 31, 32 and 33.

Figure 4:
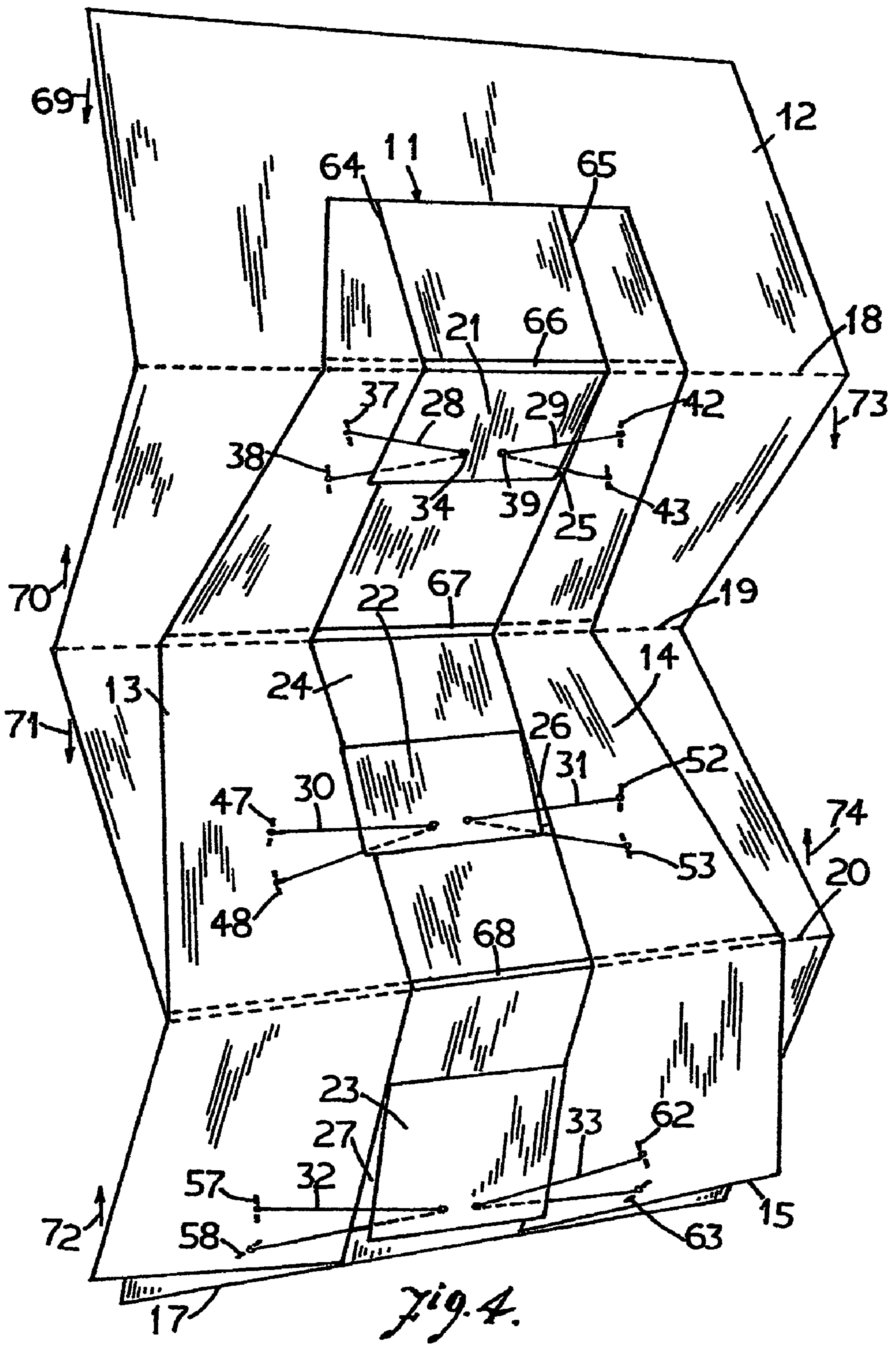
FIG. 4 is a perspective elevation view of the stand in the beginning of the folding process.
Figure 5:
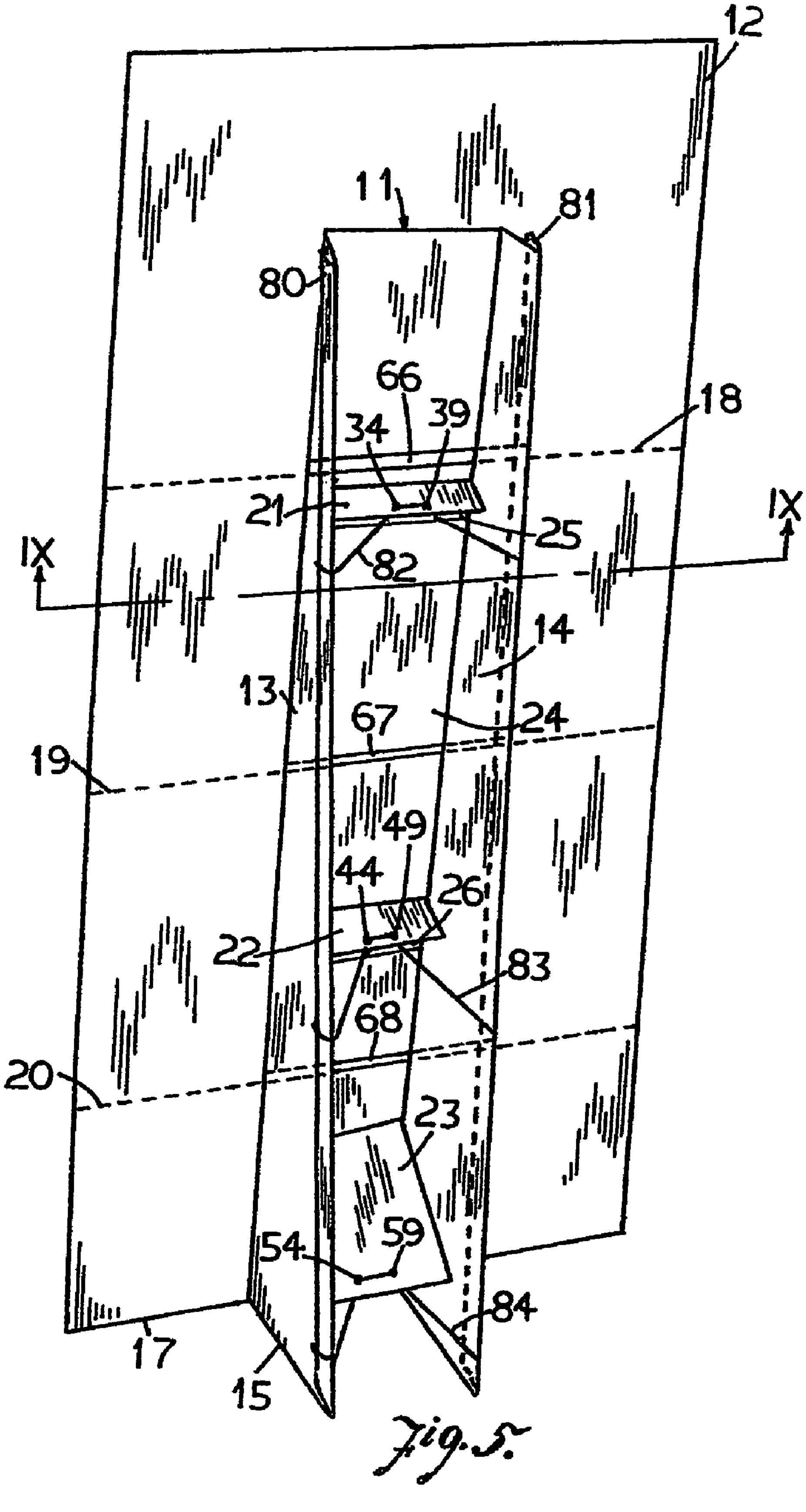
FIG. 5 is a perspective rear elevation view of an alternative preferred embodiment of the stand of the present invention in the erected condition.
Figure 6:
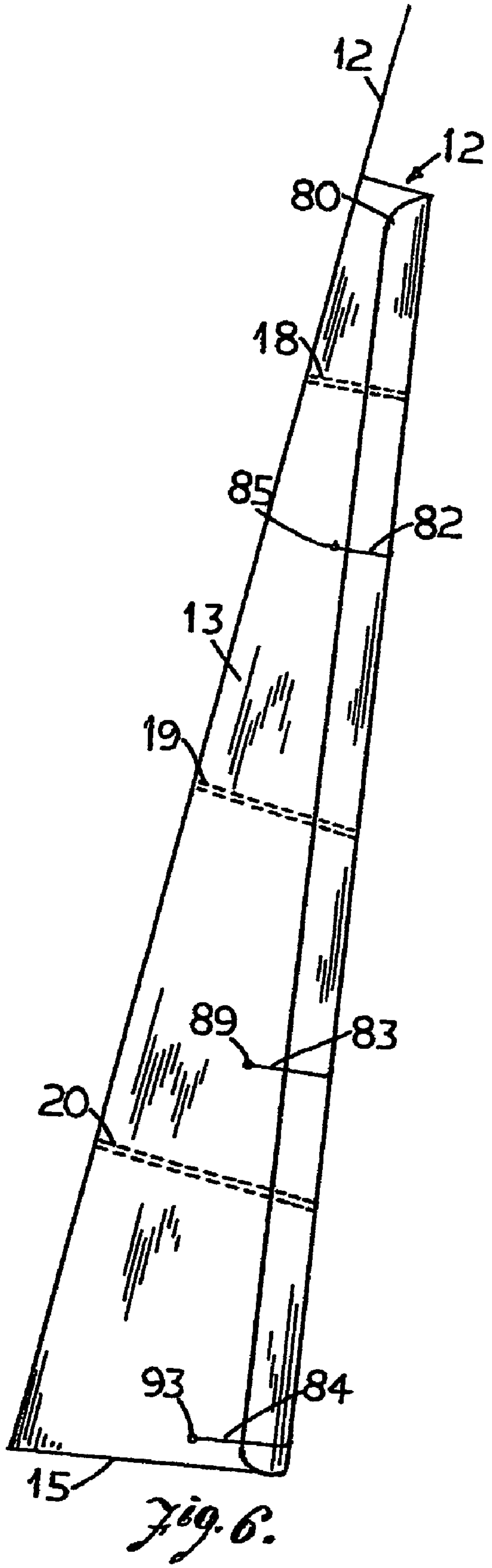
FIG. 6 is a perspective side elevation view of the stand of the preferred embodiment.
Figure 7:
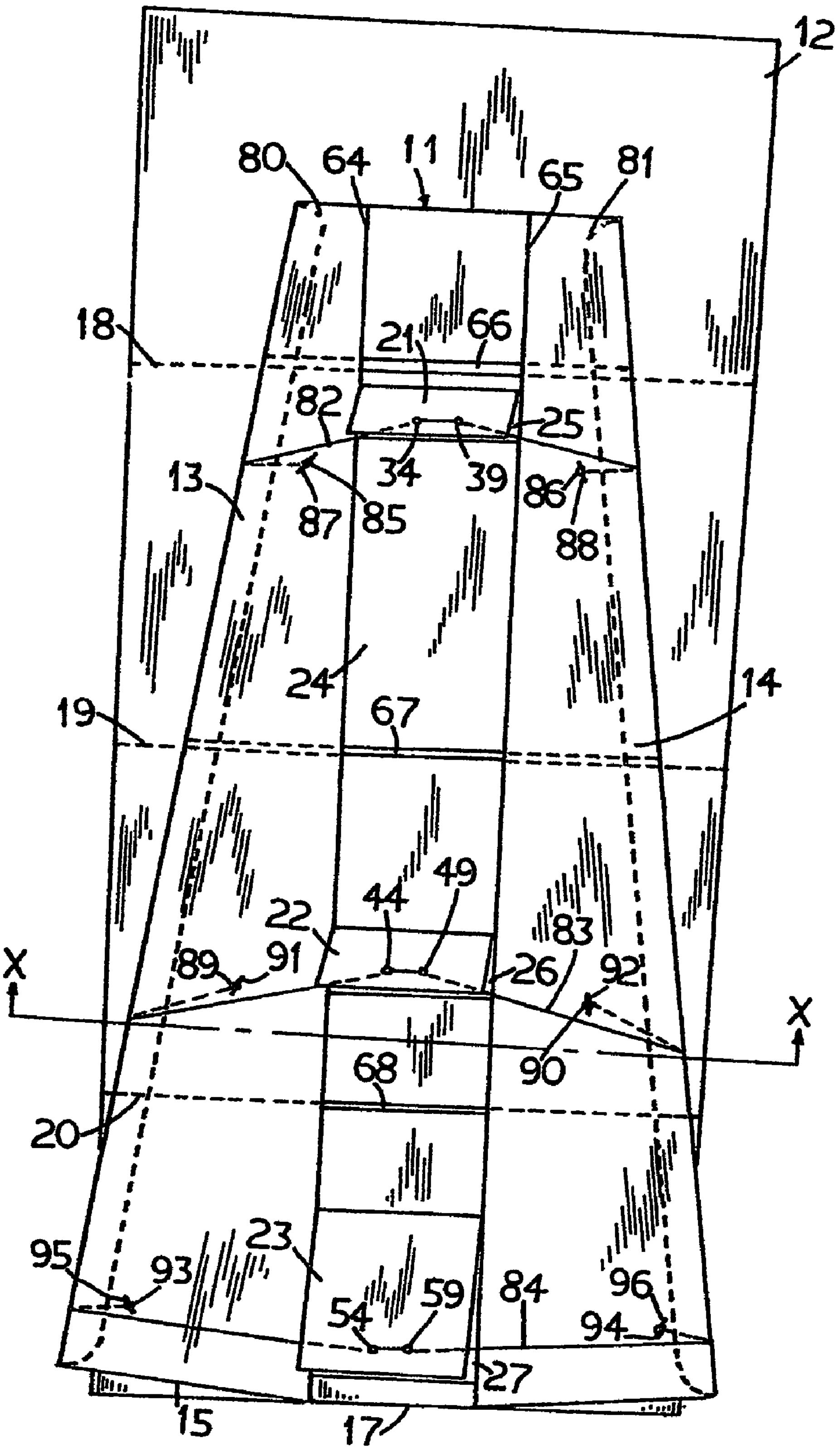
FIG. 7 is a perspective rear elevation view of the stand of the preferred embodiment with the easel in the collapsed condition.
Figure 8:
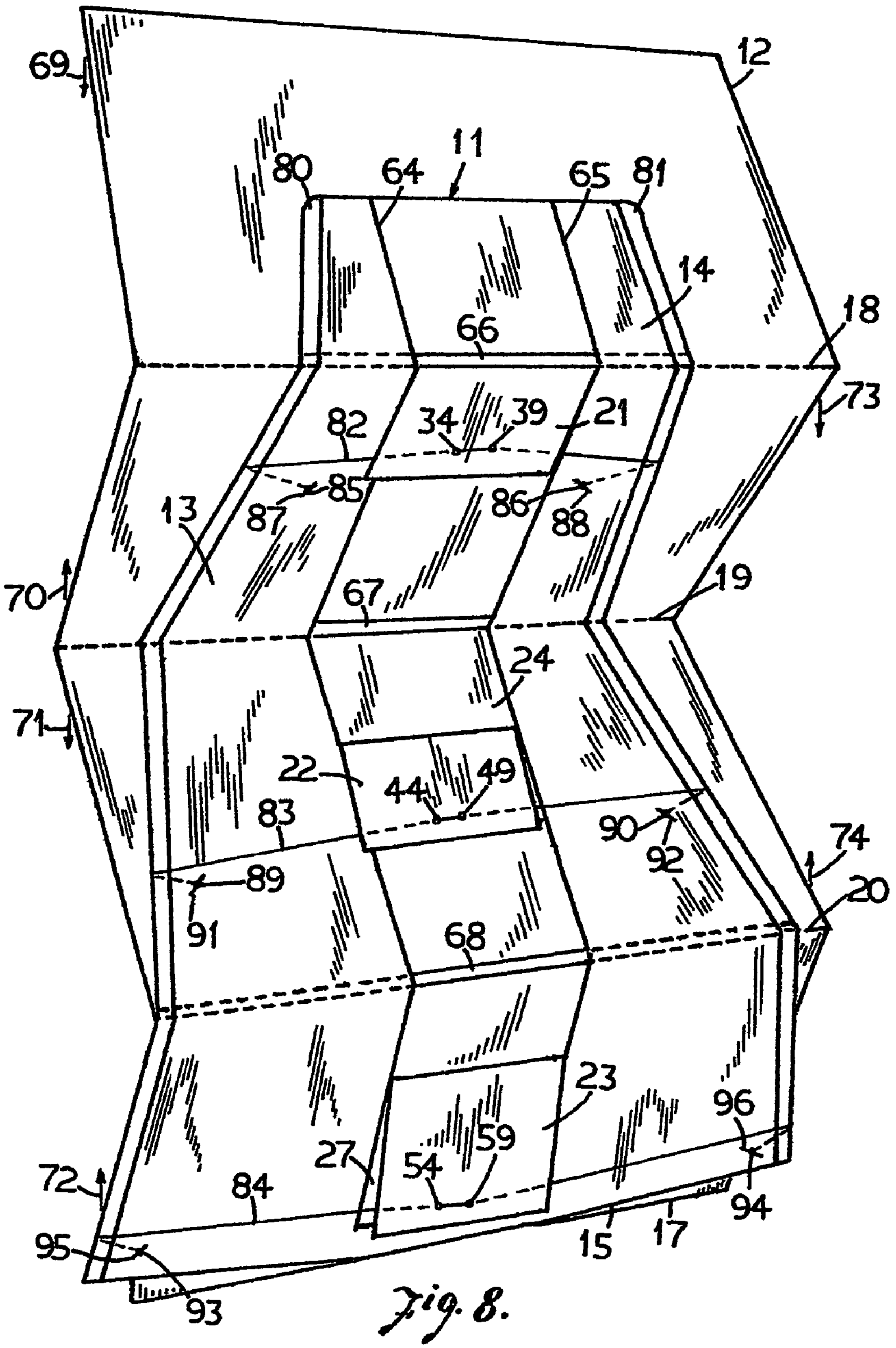
FIG. 8 is a perspective elevation view of the stand of the preferred embodiment being folded.
Figure 9:
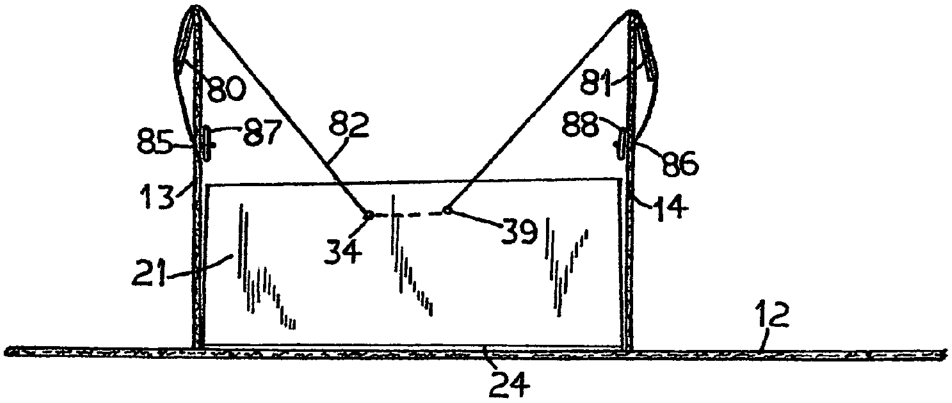
FIG. 9 is a sectional bottom view along section line IX-IX of the stand shown in FIG. 5.
Figure 10:
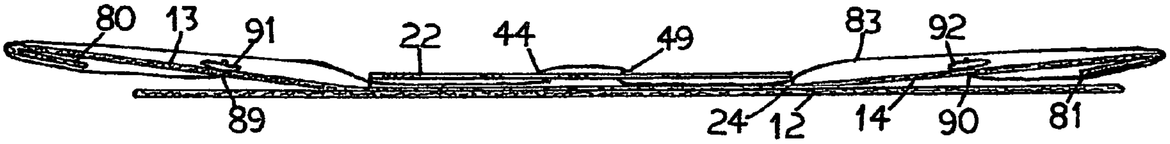
FIG. 10 is a sectional bottom view along section line X-X of the stand shown in FIG. 7.

When the side walls 13 and 14 are in the outward folded condition, the entire display stand 10 may be folded along horizontal fold lines 18, 19, and 20 of the planar board 12 in the directions shown by the arrows 69, 70, 71, 72, 73 and 74 as best shown in FIG. 4 until it is in the compact collapsed condition for convenient storage and transportation.

Elongated horizontal openings 66, 67 and 68 are formed in the central board 24 and through the planar board 12 along the horizontal fold lines 18, 19 and 20 in order that the planar board and the easel may be folded to the collapsed condition with ease.

The display stand 10 in the collapsed condition may easily be set up by simply holding it top edge 75 and raising it upwards, the elastic force in the stretched elastic cords 28, 29, 30, 31, 32 and 33 will cause the cross braces 21, 22, and 23 to pivot upwards as well as the side walls 13 and 14 of the easel 11 to pivot towards one another along fold lines 64 and 65 rendering the display self-erecting back to the erected condition. The pivot movement of the cross braces 21, 22 and 23 also pushes the side walls 13 and 14 to return to the position parallel to one another in a brushing movement over a wide surface area of the side walls and thus eliminating the elastic force of the stretched elastic cords 28, 29, 30, 31, 32 and 33 from exerting any excessive pulling force concentrating at the mounting openings in the side walls 13 and 14. Therefore, the side walls 13 and 14 would not be deformed by the elastic force of the stretched elastic cords in the self-erecting operation as in the known display stands in which the elastic bands are directly connected between small points of the mounting in the side walls of the easel.

An alternative preferred embodiment of the display stand of the present invention is shown in FIGS. 5 through 10. The embodiment further reduces the memory from the stand of its folded collapsed condition so that it can be erected automatically and readily. Vertically folded outer edge portions 80 and 81 are formed at the side walls 13 and 14 of the easel 11 to provide such function. Three elastic cords 82, 83 and 84 are employed instead of the six elastic cords as in the above embodiment. The elastic cord 82 and 84 is threaded through the openings 34 and 39 in the top cross brace 21 and its two ends are routed to wrap over the folded outer edge portions 80 and 81 to insert from the outside inwards into mounting openings 85 and 86 formed in the side walls 13 and 14. Abutment bars 87 and 88 are provided at the two ends of the elastic cord 82 to retain the cord in the mounted position. Similarly, the elastic cord 83 is threaded through the opening 44 and 49 of the middle cross brace 22 and its two ends are routed to wrap over the folded outer edge portions 80 and 81 to insert from the outside inwards into mounting openings 89 and 90 formed in the side walls 13 and 14 of the easel 11, and two abutment bars 91 and 92 are provided at its two ends to retain it in the mounted position. The elastic cord 84 is threaded through the openings 54 and 59 in the bottom cross brace 23 and its two ends are routed to wrap over the folded outer edge portions 80 and 81 to insert from the outside inwards into mounting openings 93 and 94 formed in the side walls 13 and 14 of the easel 11. Two abutment bars 95 and 96 are provided at the two ends of the elastic cords 82, 83 and 84 as shown, it will be understood that six elastic cords 28 through 33 as shown in the above embodiment may be used by routing them to wrap over the folded outer edge portions 80 and 81 to insert from the outside inwards through the mounting openings 35, 36, 40, 41, 45, 46, 50, 51, 55, 56, 60 and 61 respectively in the side walls 13 and 14 of the easel 11 to provide the same function.

The display stand 10 of the alternative embodiment may be folded in the same manner as the first embodiment described above by first folding the side walls 13 and 14 outwards along the vertical fold lines 64 and 65 against the elastic force of the elastic cords 82, 83 and 84. The planar board 12 and the folded easel may then be folded along the horizontal fold lines 18, 19 and 20 and collapse in the directions shown by the arrows 69, 70, 71, 72, 73 and 74 as in the previous embodiment. The wrapping of the elastic cords over the folded edge portions 80 and 81 ensures that these edge portions remain in the folded condition to provide the stiffness to the easel side walls as well as eliminating the folded memory of the display stand in the collapsed condition.

The full generally triangular shape of the easel side walls 13 and 14 provide the rigidity to support the display stand 10 securely in the erected condition. The bottom edges of the easel side walls 13 and 14 and the bottom edge of the planar board cooperate to support the display stand 10 to rest upon a supporting surface stably and securely.

While the present invention has been shown and described in the preferred embodiments thereof, it will be apparent that various modifications can be made therein without departing from the spirit or essential attributes thereof, and it is desired therefore that only such limitations be placed thereon as are imposed by the appended claims.

We claim:

1. A foldable and self-erecting display stand comprising:

a planar board foldable along a plurality of horizontal fold lines to a collapsed condition, an elongated easel attached to a central location of a rear surface of said planar board, said easel having a U-shaped horizontal cross section including two mutually parallel generally triangular side walls and a body board extending between said side walls, said side walls being pivotable selectively to locate in an erected position perpendicular to said planar board and a collapsed position lying juxtaposed to said planar board along a vertical fold line located between said side walls and said body board, and said side walls having horizontal associated fold lines aligned with said horizontal fold lines of said planar board, a vertically folded outer edge portion formed on the entire length of each one of said side walls of said easel, a plurality of horizontal cross braces pivotable relative to said body board and extending in a canti-lever manner from said body board and located between said side walls, two openings formed in each one of said cross braces, and a first mounting opening formed in a left side wall of said side walls and located adjacent to said one of said cross braces, and a second mounting opening formed in a right side wall of said side walls and located adjacent to said one of said cross braces, and one of elastic cord means for retaining the side walls in the erected position, cord threaded through said two openings of each one of said cross braces, and said first opening and second opening of said right side wall and left side wall respectively, two end portions of said elongated elastic cord being wrapped over said folded outer edge portion of said side walls to engage with said first mounting opening and said second mounting opening respectively, and retaining bars mounted at two free ends of said elongated elastic cord and adapted to maintain said elastic cord mounted to said side walls, elastic cord being in a stretched state when said side walls are in said collapsed position, said display stand being foldable from an erected state to a collapsed state by folding said side walls to said collapsed position and also folding said cross braces relative to said body portion and followed by folding said planar board and said easel along said horizontal fold lines, and said display stand in said collapsed state being self-erectable to an erected state by raising said stand upwards whereby said cross braces cooperate with said elastic cord in said stretched state to unfold said stand to said erected state.

2. A foldable and self-erecting display stand according to claim 1 wherein said planar board and said board of said easel include bottom edges aligned with one another and said side walls of said easel having bottom edges sloping upwardly and rearwardly whereby said bottom edges of said planar board and said bottom edges of said side walls of said easel cooperate with one another to support said display stand to rest securely on a support surface in a vertically rearward leaning manner.

3. A foldable and self-erecting display stand according to claim 2 including a plurality of elongated horizontal openings formed in said body and portions of said planar board juxtaposed to said body board, along said horizontal fold lines.

4. A foldable and self-erecting display stand according to claim 3 wherein said end portions of said elongated elastic cord are inserted from outside inwards into said first mounting opening and said second mounting opening of said left side wall and said right side wall respectively.

* * * * *